(12) United States Patent
Wong et al.

(10) Patent No.: US 7,581,331 B2
(45) Date of Patent: Sep. 1, 2009

(54) CALIBRATION DEVICE FOR NOZZLE AND CALIBRATION METHOD FOR NOZZLE

(75) Inventors: Wai Keong Alvin Wong, Singapore (SG); Tien Ching Ting, Singapore (SG); Yong-An Lin, Singapore (SG); Jin Seng Chan, Singapore (SG)

(73) Assignee: United Microelectronics Corp., Hsin-Chu (TW)

( * ) Notice: Subject to any disclaimer, the term of this patent is extended or adjusted under 35 U.S.C. 154(b) by 38 days.

(21) Appl. No.: 12/017,564

(22) Filed: Jan. 22, 2008

(65) Prior Publication Data

US 2009/0183380 A1 Jul. 23, 2009

(51) Int. Cl.
*G01B 5/25* (2006.01)
*G01B 11/27* (2006.01)

(52) U.S. Cl. .......................... 33/644; 33/520

(58) Field of Classification Search ............. 33/520, 33/533, 613, 644, 645; 414/935, 941
See application file for complete search history.

(56) References Cited

U.S. PATENT DOCUMENTS

| | | | | |
|---|---|---|---|---|
| 6,151,792 A | * | 11/2000 | Ohlig et al. ................. | 33/613 |
| 6,241,507 B1 | * | 6/2001 | Kuo ............................ | 33/613 |
| 6,467,178 B1 | * | 10/2002 | Svensson et al. ............. | 33/644 |
| 6,497,048 B2 | | 12/2002 | Romero | |
| 7,329,076 B2 | * | 2/2008 | Hartney et al. ................ | 33/613 |
| 7,400,158 B2 | * | 7/2008 | Chen .......................... | 324/758 |
| 2007/0017110 A1 | * | 1/2007 | Oishi et al. ................... | 33/645 |

* cited by examiner

*Primary Examiner*—G. Bradley Bennett
(74) *Attorney, Agent, or Firm*—Chun-Ming Shih

(57) ABSTRACT

A calibration device for a nozzle suitable for calibrating a nozzle of a semiconductor apparatus is provided. The semiconductor apparatus includes a chuck with a center hole with radius R1. A cap with outer radius R3 is disposed outside the nozzle with outer radius R2. The calibration device includes a jig including an upper portion, a lower portion and a recess in the front surface of the upper portion. The recess includes an outer portion with depth D1 and radius R4 larger than R3 and an inner portion with depth D2 larger than D1 and radius R5 larger than R2. The lower portion with a radius R6 less than R1 is connected to the back surface of the upper portion for fixing the jig in the center hole. The values of (R4−R3), (R5−R2) and (R1−R6) are in the tolerable calibration inaccuracy range.

20 Claims, 6 Drawing Sheets

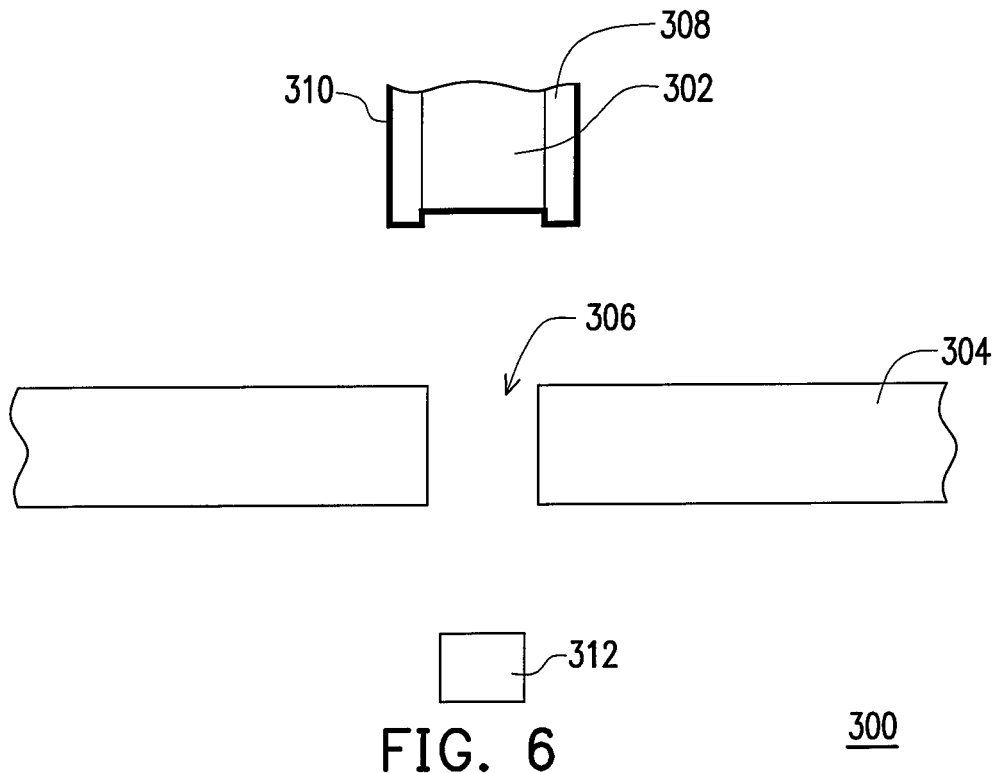

FIG. 6

| Provide the semiconductor apparatus 300 having a chuck 304 with a center hole 306, in which a cap 308 is disposed outside the nozzle 302, and the nozzle 302 and/or the cap 308 includes a substance 310 to be sensed | S200 |

| Provide the calibration device including a sensing element 312 disposed below the center hole 306 of the chuck 304 | S202 |

| Move the nozzle 302 and use the sensing element 312 to sense the substance 310 to be sensed of the nozzle 302 and/or the cap 308, so as to calibrate the nozzle 302 in the X-direction, Y-direction, and Z-direction | S204 |

FIG. 7

CALIBRATION DEVICE FOR NOZZLE AND CALIBRATION METHOD FOR NOZZLE

BACKGROUND OF THE INVENTION

1. Field of the Invention

The present invention relates to a calibration device for a semiconductor apparatus and a calibration method for a semiconductor apparatus, and more particularly to a calibration device for a nozzle and a calibration method for a nozzle.

2. Description of Related Art

Currently, many semiconductor apparatuses need a nozzle to continue the operations of a manufacturing process. For example, some semiconductor apparatuses, such as photoresist spinners and washing benches, all have a nozzle.

After the semiconductor apparatus with a nozzle has been used for a period of time, the nozzle may deflect from its original movement track, and as a result, the semiconductor apparatus cannot run accurately at the predetermined coordinate position (including X-direction, Y-direction, and Z-direction).

However, so far, once the nozzle is moved to a position deflecting from the preset coordinate position, no calibration device can be used yet to calibrate the nozzle. Therefore, the movement settings of the nozzle are still fine-adjusted by an operator based upon his/her subjective observation, and such a method is rather inaccurate.

SUMMARY OF THE INVENTION

In view of the above, the present invention is directed to a calibration device for a nozzle, capable of calibrating the position of the nozzle efficiently.

The present invention is further directed to a calibration method for a nozzle, capable of calibrating the settings of the movement of the nozzle accurately.

The present invention is still further directed to a calibration method for a nozzle, capable of enabling the nozzle to work in a correct coordinate position.

The present invention provides a calibration device for a nozzle, suitable for calibrating a nozzle of a semiconductor apparatus. The semiconductor apparatus includes a chuck having a center hole with a radius R1. A cap with an outer radius R3 is disposed outside the nozzle with an outer radius R2. The calibration device includes a jig, and the jig includes an upper portion and a lower portion. The upper portion includes a recess in the front surface of the upper portion, and the recess includes an outer portion and an inner portion. The outer portion has a depth D1 and a radius R4 larger than R3, and the value of (R4−R3) is in a tolerable calibration inaccuracy range. The inner portion has a depth D2 larger than D1 and a radius R5 larger than R2, and the value of (R5−R2) is in a tolerable calibration inaccuracy range. The lower portion is connected to the back surface of the upper portion for fixing the jig in the center hole of the chuck. The lower portion has a radius R6 smaller than R1, and the values of (R1−R6) is in the tolerable calibration inaccuracy range.

According to an embodiment of the present invention, in the calibration device for a nozzle, the jig includes at least one opening penetrating the upper portion and the lower portion.

According to an embodiment of the present invention, in the calibration device for a nozzle, the surface of the nozzle and/or the cap includes a light-reflective material layer.

According to an embodiment of the present invention, the calibration device for a nozzle further includes a light emitter/sensor disposed below the center hole for emitting a light beam and sensing the light beam reflected by the light-reflective material layer.

According to an embodiment of the present invention, in the calibration device for a nozzle, the jig is made of a light transmissive material.

According to an embodiment of the present invention, in the calibration device for a nozzle, the surface of the nozzle and/or the cap includes a light-reflective material layer.

According to an embodiment of the present invention, the calibration device for a nozzle further includes a light emitter/sensor disposed below the center hole for emitting a light beam and sensing the light beam reflected by the light-reflective material layer.

According to an embodiment of the present invention, in the calibration device for a nozzle, the jig includes a magnetic substance.

According to an embodiment of the present invention, in the calibration device for a nozzle, the nozzle and/or the cap includes a magnetic substance, so that the nozzle and/or the cap and the jig are attracted by each other due to the magnetic force.

The present invention provides a calibration method for a nozzle, suitable for using the aforementioned calibration device to calibrate the nozzle. The calibration method includes the following steps. Firstly, the lower portion of the jig is inserted into the center hole of the chuck, so as to fix the jig on the chuck. Then, the nozzle is moved, so as to insert the nozzle and the cap into the recess on the upper portion of the jig and to integrate them with the jig, so that the nozzle is calibrated in the X-direction and Y-direction. Then, the nozzle is raised, so as to make the cap be released from the recess. Subsequently, the distance between the upper surface of the jig and the cap is measured, so as to calibrate the nozzle in the Z-direction.

According to an embodiment of the present invention, the calibration method for a nozzle further includes the following steps. Firstly, the nozzle is continuously raised. Next, the distance between the upper surface of the jig and the cap are measured, so as to calibrate the nozzle in the Z-direction.

According to an embodiment of the present invention, in the calibration method for a nozzle, when the jig includes at least one opening penetrating the upper portion and the lower portion, the surface of the nozzle and/or the cap includes a light-reflective material layer, and the calibration device further includes a light emitter/sensor disposed below the center hole, the calibration method further includes the following steps. Firstly, the light emitter/sensor emits a light beam to the light-reflective material layer. Next, the light emitter/sensor is used to sense the light beam reflected by the light-reflective material layer, so as to calibrate the nozzle in the X-direction, Y-direction, and Z-direction.

According to an embodiment of the present invention, in the calibration method for a nozzle, when the jig is made of a light transmissive material, the surface of the nozzle and/or the cap includes a light-reflective material layer, and the calibration device further includes the light emitter/sensor disposed below the center hole, the calibration method further includes the following steps. Firstly, the light emitter/sensor is used to emit a light beam to the light-reflective material layer. Next, the light emitter/sensor is used to sense the light beam reflected by the light-reflective material layer, so as to calibrate the nozzle in the X-direction, Y-direction, and Z-direction.

According to an embodiment of the present invention, in the calibration method for a nozzle, when the jig includes a magnetic substance and the nozzle and/or the cap includes a magnetic substance, the calibration method further includes making the nozzle and/or the cap and the jig be attracted by each other due to the magnetic force, so as to calibrate the nozzle in the X-direction, Y-direction, and Z-direction.

According to an embodiment of the present invention, in the calibration method for a nozzle, a tool for measuring the distance between the upper surface of the jig and the cap includes a feeder gauge or a laser distance meter.

The present invention provides another calibration method for a nozzle, suitable for calibrating a nozzle of a semiconductor apparatus, and the calibration method includes the following steps. Firstly, a semiconductor apparatus having a chuck with a center hole is provided, a cap is disposed outside the nozzle, and the nozzle and/or the cap includes a substance to be sensed. Next, the calibration device is provided, which includes a sensing element disposed below the center hole of the chuck. Then, the nozzle is moved and the sensing element is used to sense the substance to be sensed of the nozzle and/or the cap, so as to calibrate the nozzle in the X-direction, Y-direction, and Z-direction.

According to another embodiment of the present invention, in the calibration method for a nozzle, the substance to be sensed includes a reflective material layer coated on the surface of the nozzle and/or the cap.

According to another embodiment of the present invention, in the calibration method for a nozzle, the sensing element includes a light emitter/sensor.

According to another embodiment of the present invention, in the calibration method for a nozzle, the substance to be sensed and the sensing element include a magnetic substance.

According to another embodiment of the present invention, in the calibration method for a nozzle, the sensing element further includes a magnetic sensor.

In view of the above, the calibration method for a nozzle provided by the present invention is capable of accurately positioning the nozzle at the coordinate position. Therefore, the settings for the movement of the nozzle may be calibrated efficiently, so that the nozzle can work at the correct coordinate position.

In order to make the aforementioned and other objects, features and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a cross-sectional view of a calibration device according to a fourth embodiment of the present invention.

FIG. 7 is a flow chart of a calibration method for a nozzle performed by the calibration device according to the fourth embodiment of the present invention.

DESCRIPTION OF EMBODIMENTS

Figure 1:
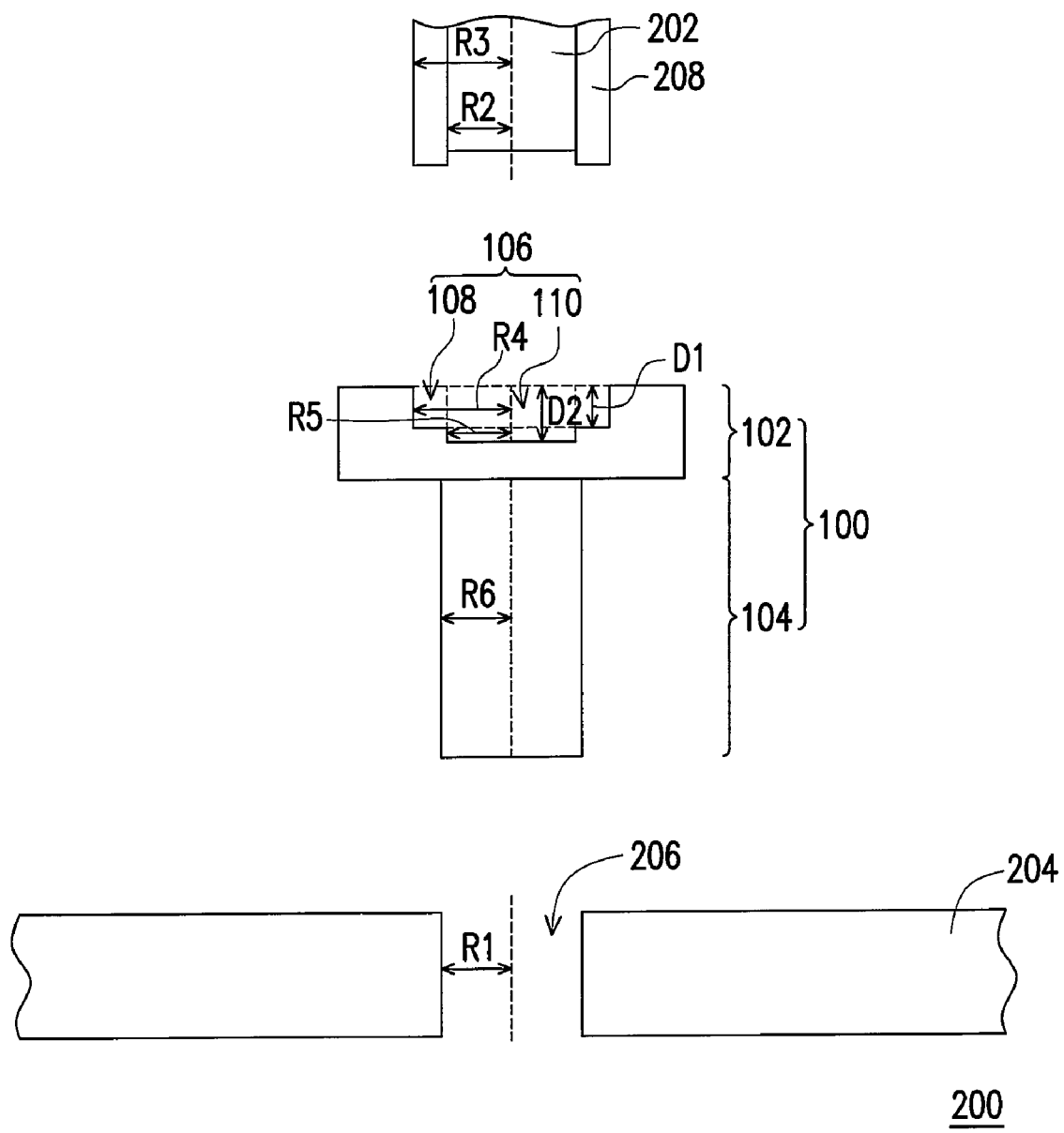
FIG. 1 is a cross-sectional view of a calibration device according to a first embodiment of the present invention.

FIG. 1 is a cross-sectional view of a calibration device according to a first embodiment of the present invention.

Referring to FIG. 1, the calibration device is suitable for calibrating a nozzle 202 of a semiconductor apparatus 200. The semiconductor apparatus 200 includes a chuck 204 having a center hole 206 with a radius R1. A cap 208 is disposed outside the nozzle 202. Wherein, the nozzle 202 has an outer radius R2, and the cap 208 has an outer radius R3. The semiconductor apparatus 200 is, for example, a photoresist spinner and a washing bench. In the first embodiment, the cap 208 protrudes out of the nozzle 202 about 1 mm, for example.

The calibration device includes a jig 100. The jig 100 includes an upper portion 102 and a lower portion 104. The jig 100 includes a recess 106 in the front surface of the upper portion 102. The recess 106 includes an outer portion 108 and an inner portion 110. The outer portion 108 has a depth D1 and a radius R4 larger than R3, and the value of (R4−R3) is in a tolerable calibration inaccuracy range. The inner portion 110 has a depth D2 larger than D1 and a radius R5 larger than R2, and the value of (R5−R2) is in a tolerable calibration inaccuracy range. Under the limitations of the aforementioned radiuses, the nozzle 202 and the cap 208 can be received in the recess 106, without causing the calibration inaccuracy value to go beyond a tolerable inaccuracy range.

The lower portion 104 is connected to the back surface of the upper portion 102, so as to fix the jig 100 in the center hole 206 of the chuck 204. The lower portion 104 has a radius R6 smaller than R1, and the value of (R1−R6) is in the tolerable calibration inaccuracy range. Under the limitations of the aforementioned radiuses, the lower portion 104 of the jig 100 can be received in the center hole 206, without causing the calibration inaccuracy value to go beyond a tolerable inaccuracy range.

Figure 2A:
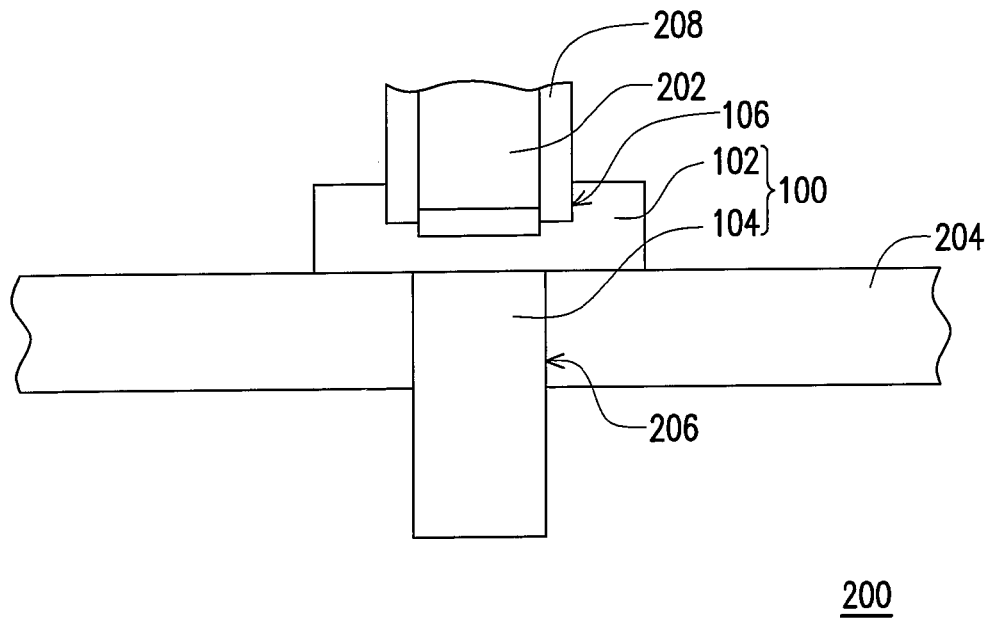
FIGS. 2A to 2C are cross-sectional views of a flow of a calibration method for a nozzle performed by the calibration device according to the first embodiment of the present invention.
Figure 2B:
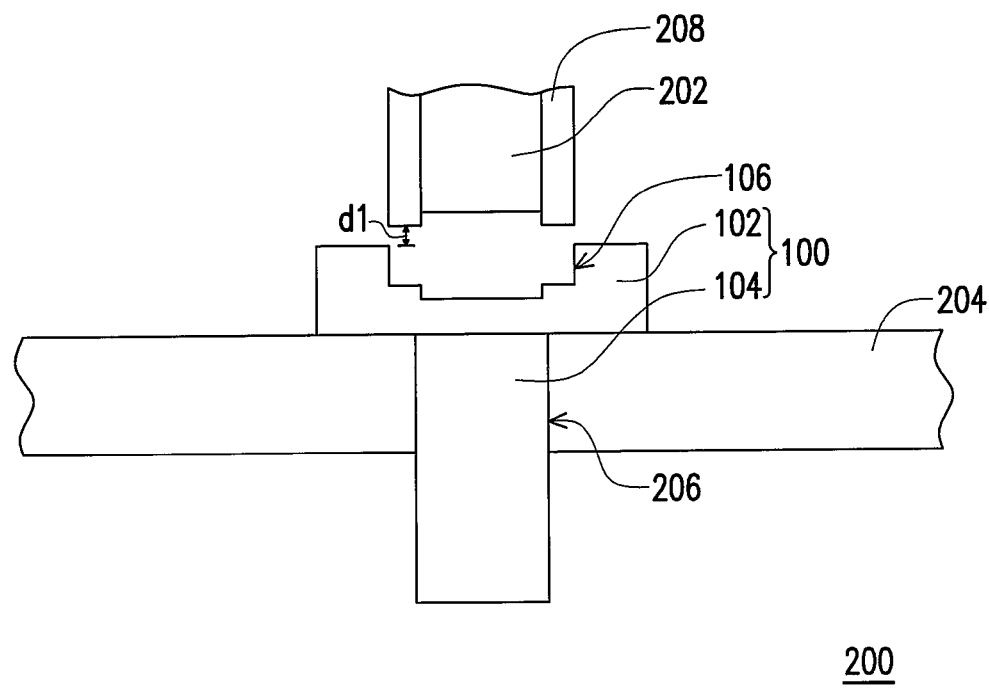
Figure 2C:
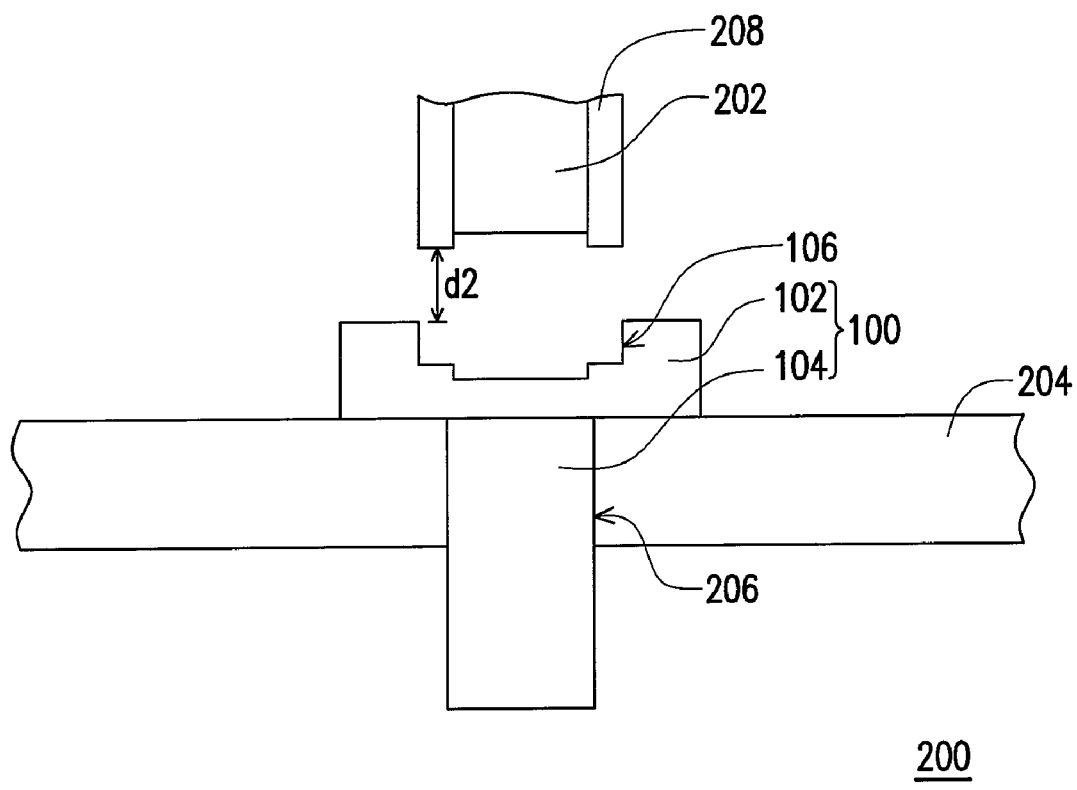
Figure 3:
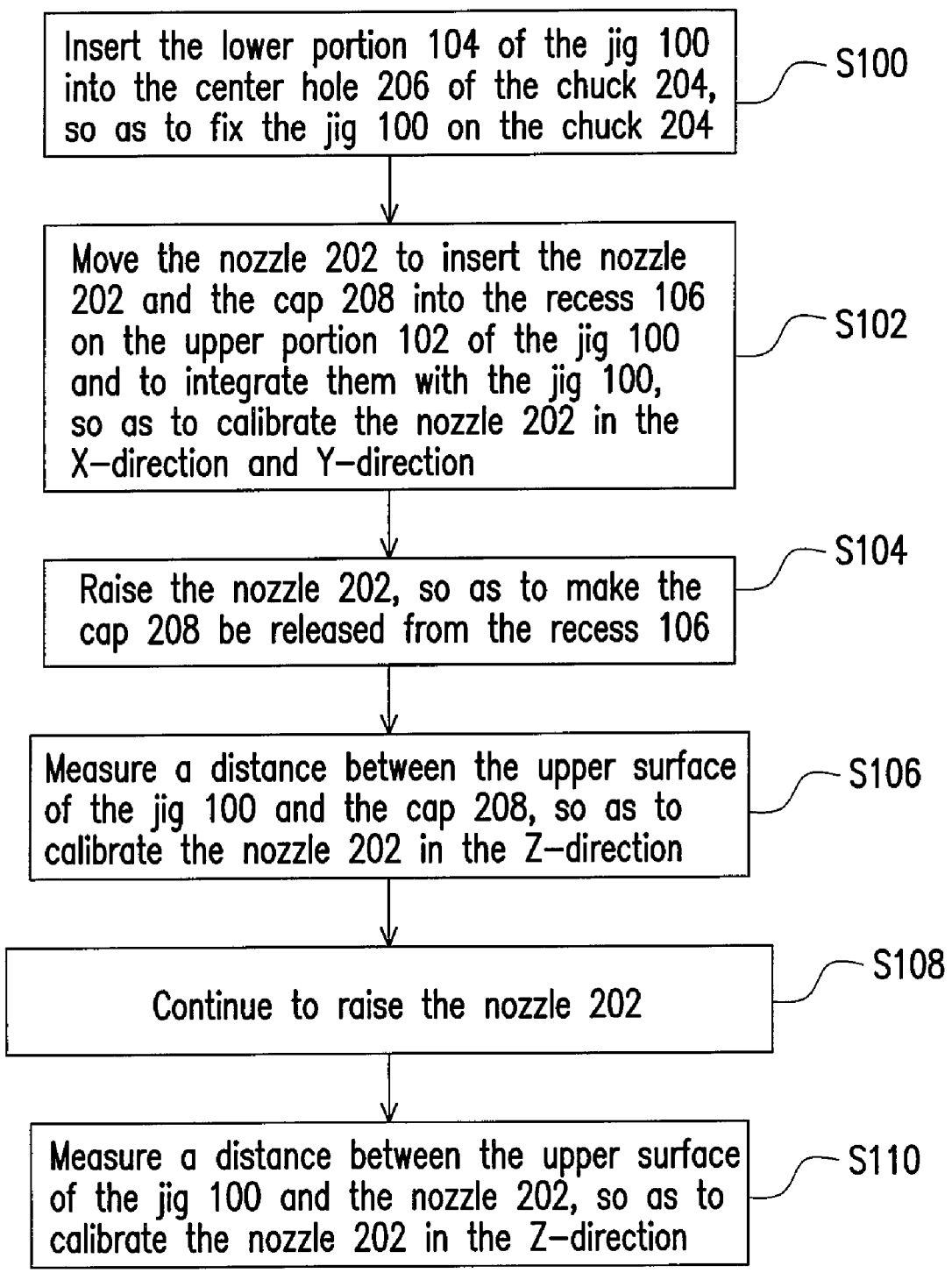
FIG. 3 is a flow chart of the calibration method for a nozzle performed by the calibration device according to the first embodiment of the present invention.

FIGS. 2A to 2C are cross-sectional views of a flow of a calibration method for a nozzle performed by the calibration device according to the first embodiment of the present invention. FIG. 3 is a flow chart of the calibration method for a nozzle performed by the calibration device according to the first embodiment of the present invention.

Referring to FIGS. 2A and 3, firstly, in Step S100, the lower portion 104 of the jig 100 is inserted into the center hole 206 of the chuck 204, so as to fix the jig 100 on the chuck 204. In this manner, the center of the chuck 204 may be taken as a reference for calibration.

Next, in Step S102, the nozzle 202 is moved, so as to insert the nozzle 202 and the cap 208 into the recess 106 on the upper portion 102 of the jig 100 and to integrate them with the jig 100, so as to calibrate the nozzle 202 in the X-direction and Y-direction.

Referring to FIGS. 2B and 3, in Step S104, the nozzle 202 is raised, so as to make the cap 208 be released from the recess 106.

Subsequently, in Step S106, a distance d1 between the upper surface of the jig 100 and the cap 208 is measured, so as to calibrate the nozzle 202 in the Z-direction. A tool for measuring the distance d1 between the upper surface of the jig 100 and the cap 208 is, for example, a feeder gauge or a laser distance meter.

Referring to FIGS. 2C and 3, Step S108 is selectively performed to continuously raise the nozzle 202.

Furthermore, after Step S108, Step S110 is performed to measure a distance d2 between the upper surface of the jig 100 and the cap 208, so as to calibrate the nozzle 202 in the Z-direction. The tool for measuring the distance d2 between the upper surface of the jig 100 and the cap 208 is, for example, a feeder gauge or a laser distance meter.

In addition, in other embodiments, the jig 100, the nozzle 202, and/or the cap 208 may include a magnetic substance, i.e., a magnetic substance is disposed on the jig 100, the nozzle 202 and/or the cap 208, or the jig 100, the nozzle 202, and/or the cap 208 themselves are made of a magnetic material. As such, the nozzle 202 and/or the cap 208 and the jig 100 may be attracted by each other to be fixed at a position due to magnetic force, so as to assist to calibrate the nozzle 202 in the X-direction, Y-direction, and Z-direction.

From the first embodiment, it can be known that the jig 100 may be used to accurately position the nozzle 202 at the coordinate position. Therefore, the settings for the movement of the nozzle 202 may be calibrated efficiently, thereby enabling the nozzle 202 to work in a correct coordinate position.

Moreover, when the jig 100, the nozzle 202, and/or the cap 208 include a magnetic substance, it may effectively assist the calibration of the nozzle 202.

Figure 4:
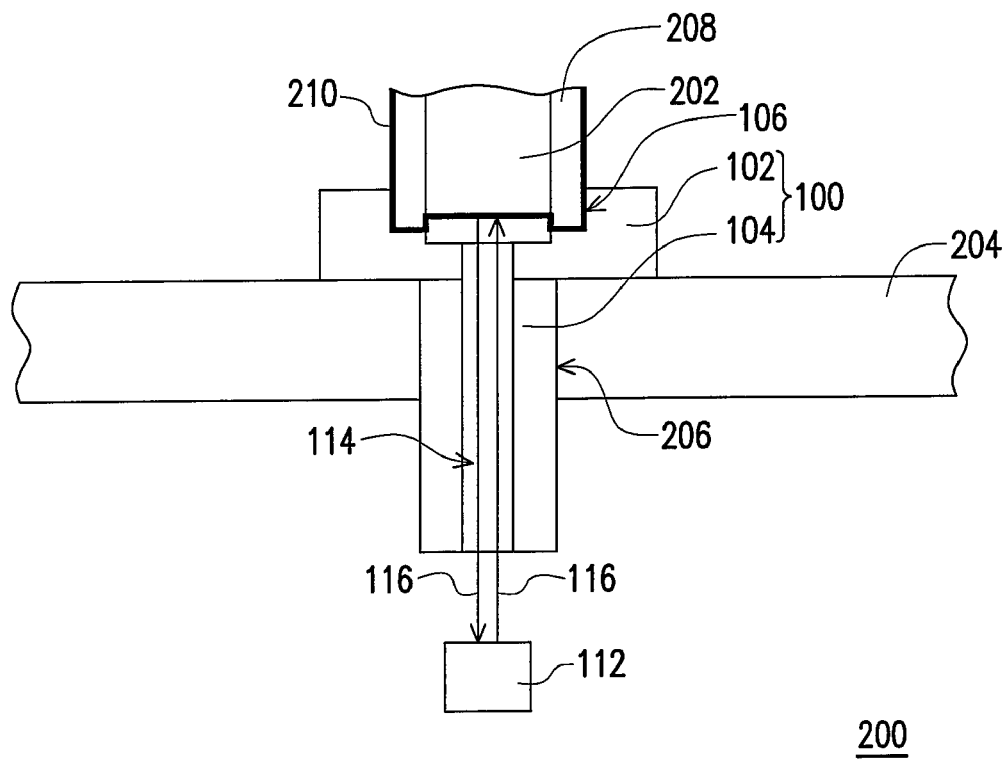
FIG. 4 is a cross-sectional view of a calibration device according to a second embodiment of the present invention.
Figure 5:
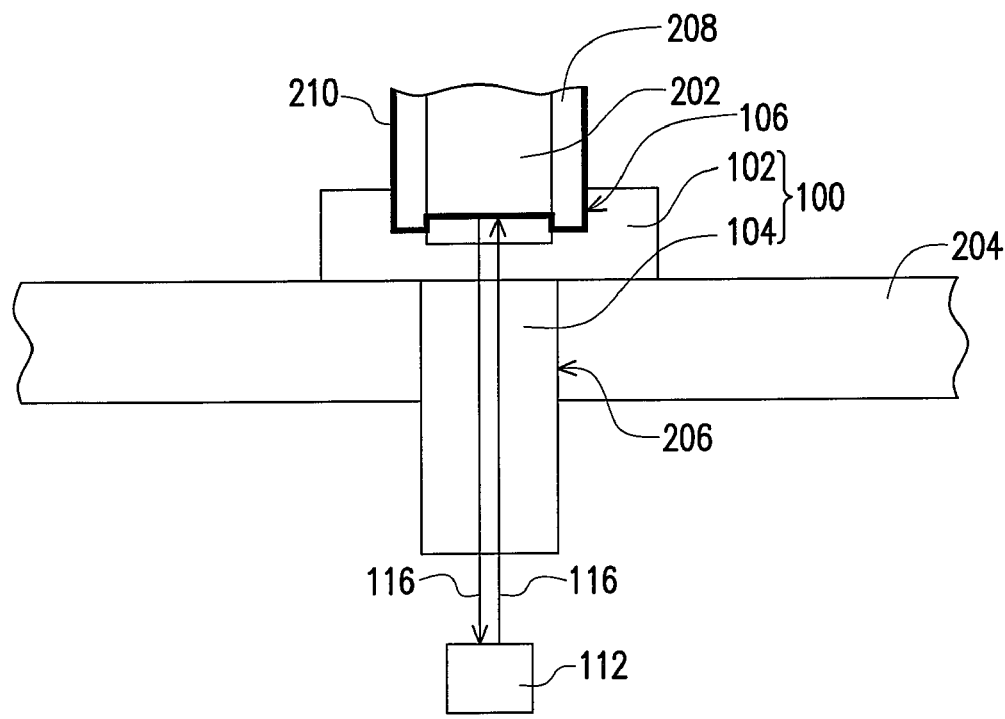
FIG. 5 is a cross-sectional view of a calibration device according to a third embodiment of the present invention.

FIG. 4 is a cross-sectional view of a calibration device according to a second embodiment of the present invention. FIG. 5 is a cross-sectional view of a calibration device according to a third embodiment of the present invention. Those elements in FIGS. 4 and 5 the same as that in FIG. 2 are indicated by the same reference numerals as that in FIG. 2, which will not be repeated here.

Referring to FIGS. 2, 4, and 5, the most significant difference between the second embodiment in FIG. 4 and the first embodiment in FIG. 2 lies in that, in the second embodiment, the surface of the nozzle 202 and/or the cap 208 includes a light-reflective material layer 210, the calibration device further includes a light emitter/sensor 112, and the jig further includes at least one opening 114, which penetrates through the upper portion 102 and the lower portion 104.

Furthermore, the most significant difference between the third embodiment in FIG. 5 and the first embodiment in FIG. 2 lies in that, in the third embodiment, the surface of the nozzle 202 and/or the cap 208 includes a light-reflective material layer 210, the calibration device further includes a light emitter/sensor 112, and the jig 100 is made of a light transmissive material.

The calibration methods for the nozzle 202 in the first embodiment, the second embodiment, and the third embodiment are substantially the same, and the difference lies in that, the second embodiment and the third embodiment have the light emitter/sensor 112 and the light-reflective material layer 210, which are used to assist the calibration of the nozzle 202 in the X-direction, Y-direction, and Z-direction.

In the second and third embodiments, the process of using the light emitter/sensor 112 and the light-reflective material layer 210 to assist the calibration of the nozzle 202 is described as follows. Firstly, the light emitter/sensor 112 is used to emit a light beam 116, which passes through the jig 100 to reach the light-reflective material layer 210. Then, the light emitter/sensor 212 is used to sense the light beam 116 reflected by the light-reflective material layer 210, so as to calibrate the nozzle 202 in the X-direction, Y-direction, and Z-direction.

FIG. 6 is a cross-sectional view of a calibration device according to a fourth embodiment of the present invention. FIG. 7 is a flow chart of a calibration method for a nozzle performed by the calibration device according to the fourth embodiment of the present invention.

Referring to FIG. 6, the calibration method in the fourth embodiment is suitable for calibrating a nozzle 302 of a semiconductor apparatus 300.

Referring to FIGS. 6 and 7, firstly, in Step S200, the semiconductor apparatus 300 having a chuck 304 with a center hole 306 is provided, a cap 308 is disposed outside the nozzle 302, and the nozzle 302 and/or the cap 308 includes a substance 310 to be sensed. The semiconductor apparatus 300 is, for example, a photoresist spinner and a washing bench.

In this embodiment, the substance 310 to be sensed is, for example, the reflective material layer or the magnetic substance layer coated on the nozzle 302 and/or the cap 308. In other embodiments, the substance 310 to be sensed may be dispersed in the nozzle 302 and/or the cap 308, i.e., the nozzle 302 and/or the cap 308 is made of the substance 310 to be sensed, for example, a reflective material or a magnetic material.

Next, in Step S202, the calibration device is provided, which includes a sensing element 312 disposed below the center hole 306 of the chuck 304. When the substance 310 to be sensed is a reflective material layer, the sensing element 312 is, for example, a light emitter/sensor. In addition, when the substance 310 to be sensed is a magnetic substance layer, the sensing element 312 includes a magnetic substance, and the sensing element 312 further includes a magnetic sensor.

Subsequently, in Step S204, the nozzle 302 is moved and the sensing element 312 is used to sense the substance 310 to be sensed of the nozzle 302 and/or the cap 308, so as to calibrate the nozzle 302 in the X-direction, Y-direction, and Z-direction.

When the substance 310 to be sensed is a reflective material layer, the sensing element 312 is a light emitter/sensor, and the calibration method for the nozzle 302 is described as follows. Firstly, the sensing element 312 is used to emit a light beam, and the light beam passes through the center hole 306 to reach the substance 310 to be sensed. Then, the sensing element 312 is used to sense the light beam reflected by the substance 310 to be sensed, so as to calibrate the nozzle 302 in the X-direction, Y-direction, and Z-direction.

When the substance 310 to be sensed is a magnetic substance layer, the sensing element 312 may have a magnetic substance and also may have a magnetic sensor. The calibration method for the nozzle 302 is described as follows. The nozzle 302 and/or the cap 308 and the sensing element 312 are attracted by each other to be fixed at a position due to the magnetic force, so as to calibrate the nozzle 302 in the X-direction, Y-direction, and Z-direction. Furthermore, the magnetic force is measured by the magnetic sensor, so as to assist the calibration of the nozzle 302 in the X-direction, Y-direction, and Z-direction.

In view of the above, the present invention has at least the following advantages.

1. The calibration device for a nozzle provided by the present invention is capable of positioning the nozzle at a coordinate position accurately.

2. The calibration method for a nozzle provided by the present invention is capable of calibrating the settings for the movement of the nozzle efficiently.

3. The calibration method for a nozzle provided by the present invention is capable of enabling the nozzle to work at a correct coordinate position.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A calibration device for a nozzle, suitable for calibrating a nozzle of a semiconductor apparatus, wherein the semiconductor apparatus comprises a chuck having a center hole with a radius R1, a cap with an outer radius R3 is disposed outside the nozzle with an outer radius R2, and the calibration device comprising a jig, wherein the jig comprises:

an upper portion, including a recess in a front surface of the upper portion, wherein the recess comprises:

an outer portion, having a depth D1 and a radius R4, wherein R4 is larger than R3, and the value of (R4−R3) is in a tolerable calibration inaccuracy range; and an inner portion, having a depth D2 and a radius R5, wherein D2 is larger than D1, R5 is larger than R2, and the value of (R5−R2) is in a tolerable calibration inaccuracy range; and a lower portion, connected to a back surface of the upper portion, so as to fix the jig in the center hole of the chuck, wherein the lower portion has a radius R6, R6 is smaller than R1, and the value of (R1−R6) is in a tolerable calibration inaccuracy range.

2. The calibration device as claimed in claim 1, wherein the jig comprises at least one opening penetrating through the upper portion and the lower portion.

3. The calibration device of claim 2, wherein the surface of the nozzle and/or the cap comprises a light-reflective material layer.

4. The calibration device of claim 3, further comprising a light emitter/sensor, disposed below the center hole for emitting a light beam and sensing the light beam reflected by the light-reflective material layer.

5. The calibration device of claim 1, wherein the jig is made of a light transmissive material.

6. The calibration device of claim 5, wherein the surface of the nozzle and/or the cap comprises a light-reflective material layer.

7. The calibration device of claim 6, further comprising a light emitter/sensor, disposed below the center hole for emitting a light beam and sensing the light beam reflected by the light-reflective material layer.

8. The calibration device of claim 1, wherein the jig comprises a magnetic substance.

9. The calibration device of claim 8, wherein the nozzle and/or the cap comprises the magnetic substance, so that the nozzle and/or the cap and the jig are attracted by each other due to the magnetic force.

10. A calibration method for a nozzle, suitable for using the calibration device of claim 1 to calibrate the nozzle, comprising:

inserting the lower portion of the jig into the center hole of the chuck, so as to fix the jig on the chuck;

moving the nozzle to insert the nozzle and the cap into the recess on the upper portion of the jig and to integrate the nozzle and the cap with the jig, so as to calibrate the nozzle in an X-direction and a Y-direction;

raising the nozzle to make the cap be released from the recess; and measuring a distance between the upper surface of the jig and the cap, so as to calibrate the nozzle in a Z-direction.

11. The calibration method of claim 10, further comprising:

continuing to raise the nozzle; and measuring a distance between the upper surface of the jig and the cap, so as to calibrate the nozzle in the Z-direction.

12. The calibration method of claim 10, wherein when the jig comprises at least one opening penetrating the upper portion and the lower portion, the surface of the nozzle and/or the cap comprises a light-reflective material layer, and the calibration device further comprises a light emitter/sensor disposed below the center hole, the calibration method further comprises:

using the light emitter/sensor to emit a light beam to the light-reflective material layer; and using the light emitter/sensor to sense the light beam reflected by the light-reflective material layer, so as to calibrate the nozzle in the X-direction, Y-direction, and Z-direction.

13. The calibration method of claim 10, wherein when the jig is made of a light transmissive material, the surface of the nozzle and/or the cap comprises a light-reflective material layer, and the calibration device further comprises a light emitter/sensor disposed below the center hole, the calibration method further comprises:

using the light emitter/sensor to emit a light beam to the light-reflective material layer; and using the light emitter/sensor to sense the light beam reflected by the light-reflective material layer, so as to calibrate the nozzle in the X-direction, Y-direction, and Z-direction.

14. The calibration method of claim 10, wherein when the jig comprises a magnetic substance and the nozzle and/or the cap comprises the magnetic substance, the calibration method further comprises:

making the nozzle and/or the cap and the jig be attracted by each other due to magnetic force, so as to calibrate the nozzle in the X-direction, Y-direction, and Z-direction.

15. The calibration method of claim 10, wherein a tool for measuring the distance between the upper surface of the jig and the cap comprises a feeder gauge or a laser distance meter.

16. A calibration method for a nozzle, suitable for calibrating a nozzle of a semiconductor apparatus, comprising:

providing a semiconductor apparatus, wherein the semiconductor apparatus has a chuck with a center hole, a cap is disposed outside the nozzle, and the nozzle and/or the cap comprises a substance to be sensed;

providing a calibration device, wherein the calibration device comprises a sensing element disposed below the center hole of the chuck; and moving the nozzle and using the sensing element to sense the substance to be sensed of the nozzle and/or the cap, so as to calibrate the nozzle in the X-direction, Y-direction, and Z-direction.

17. The calibration method of claim 16, wherein the substance to be sensed comprises a reflective material layer coated on the surface of the nozzle and/or the cap.

18. The calibration method of claim 17, wherein the sensing element comprises a light emitter/sensor.

19. The calibration method of claim 16, wherein the substance to be sensed and the sensing element comprise a magnetic substance.

20. The calibration method of claim 17, wherein the sensing element further comprises a magnetic sensor.

* * * * *